United States Patent [19]
Baranowsky, II et al.

[11] Patent Number: 5,732,359
[45] Date of Patent: Mar. 24, 1998

[54] MOBILE TERMINAL APPARATUS AND METHOD HAVING NETWORK INTER-OPERABILITY

[75] Inventors: Patrick W. Baranowsky, II, Columbia; Craig R. Meseke, Parkton; Brooks Cressman, Baltimore, all of Md.

[73] Assignee: Westinghouse Electric Corporation, Pittsburgh, Pa.

[21] Appl. No.: 323,417

[22] Filed: Oct. 13, 1994

Related U.S. Application Data

[63] Continuation-in-part of Ser. No. 242,110, May 13, 1994, abandoned.

[51] Int. Cl.$^6$ .................................................. H04B 1/38
[52] U.S. Cl. ........................... 455/552; 455/74; 455/435; 455/437
[58] Field of Search ...................... 455/12.1, 11.1, 455/13.1, 33.1, 33.2, 33.4, 54.1, 56.1, 74, 89, 435, 437, 552; 379/58, 59, 60

[56] References Cited

U.S. PATENT DOCUMENTS

| | | | |
|---|---|---|---|
| 4,143,322 | 3/1979 | Shimamura | 325/320 |
| 4,318,049 | 3/1982 | Mogenson | 329/50 |
| 4,466,108 | 8/1984 | Rhodes | 375/83 |
| 4,787,096 | 11/1988 | Wong | 375/120 |
| 4,879,728 | 11/1989 | Tarallo | 375/80 |
| 5,008,925 | 4/1991 | Pireh | 379/60 |
| 5,276,905 | 1/1994 | Hurst et al. | 455/33.1 |
| 5,303,393 | 4/1994 | Noreen et al. | 455/3.2 |
| 5,481,592 | 1/1996 | Azer | 379/58 |
| 5,490,284 | 2/1996 | Itoh et al. | 455/11.1 |
| 5,535,430 | 7/1996 | Aoki et al. | 455/54.1 |
| 5,535,432 | 7/1996 | Dent | 455/77 |
| 5,564,077 | 10/1996 | Obayashi et al. | 455/89 |

OTHER PUBLICATIONS

Connelly, "Design of the Westinghouse Series 1000 Mobile Phone," IEEE, pp. 347–350, May 18, 1993.
Connelly, "Westinghouse Series 1000 Mobile Phone: Technology and Applications," IEEE, pp. 375–379, May 18, 1993.
John Everett, European Satellite Communication 89, 1989, pp. 25–33.

*Primary Examiner*—Edward F. Urban
*Assistant Examiner*—Lee Nguyen

[57] ABSTRACT

A mobile terminal apparatus that operates in both the cellular and satellite networks. The terminal device has five different operating modes. It operates in a satellite only mode, a cellular only mode, an autoroam with satellite priority mode, an autoroam with cellular priority mode, and autoroam with cellular home location register (HLR) priority mode. The terminal apparatus monitors the cellular operation and satellite operation concomitantly. When a call is in progress in the cellular system, a seamless handoff may be effected to the satellite system.

7 Claims, 7 Drawing Sheets

MOBILE TERMINAL APPARATUS AND METHOD HAVING NETWORK INTEROPERABILITY

This is a continuation-in-part of U.S. patent application Ser. No. 08/242,110 filed May 13, 1994, entitled "Mobile Terminal Apparatus and Method Having Network Interoperability", now abandoned.

BACKGROUND OF THE INVENTION

1. Field of the Invention

The present invention relates to a mobile terminal apparatus and method for telephonic communication; and more particularly, to a mobile terminal apparatus and method suitable for use with either a cellular or satellite networks.

2. Related Applications

U.S. patent application entitled "Mobile Terminal Apparatus and Method For A Satellite Communication System" Ser. No. 08/322,858 filed by Albert J. Fasulo II, Denise M. Cammarata, Keith W. Janson, Samuel S. Anderson, Raymond R. Cooper, and Roy Stehlik, on the same date as the instant application which is a continuation-in-part of U.S. patent application Ser. No. 08/242,400 filed May 13, 1994, is incorporated by reference.

U.S. patent application entitled "Carrier Acquisition Technique For Mobile Radio QPSK Demodulator" filed by Brian W. Kroeger, Joseph B. Bronder, and Jeffrey S. Baird on the same date as the instant application.

U.S. patent application entitled "Locally Coherent QPSK Detection With Differential Decoding For A Fading Channel", Ser. No. 08/322,846 filed by Brian W. Kroeger, Joseph B. Bronder, and Jeffrey S. Baird, on the same date as the instant application is incorporated by reference.

U.S. patent application entitled "A Digital Quadriphase-Shift Keying Modulator" filed by Brian W. Kroeger and Roy Stehlik on the same date as the instant application, is incorporated by reference, now U.S. Pat. No. 5,523,726.

U.S. patent application entitled "Numerically Controlled Oscillator With Complex Exponential Outputs Using Recursion Technique" filed by Brian W. Kroeger and Jeffrey S. Baird on the same date as the instant application, is incorporated by reference, now U.S. Pat. No. 5,517,535.

U.S. patent application entitled "Carrier Tracking Loop For QPSK Demodulator" filed by Brian W. Kroeger, Jeffrey S. Baird, and Joseph B. Bronder on the same date as the instant application, is incorporated by reference, now U.S. Pat. No. 5,579,345.

U.S. patent application entitled "Symbol Synchronizer Using Modified Early/Punctual/Late Gate Technique", Ser. No. 08/322,854 filed by Brian W. Kroeger, Joseph B. Bronder, Tod A. Oblak, and Jeffrey S. Baird, on the same date as the instant application, is incorporated by reference.

DESCRIPTION OF RELATED ART

Cellular telephone coverage is complete in practically all urban and suburban areas, and offers a cost affective interface to the Public Switched Telephone Network (PSTN). However, cellular telephone systems are not economically feasible for sparsely populated areas; and many applications such as marine, airborne, fax and data communications, for example, are implemented only by Mobile Satellite Telephone Networks, herein referred to as (MSAT).

In addition to geographical areas and applications that are exclusively devoted to either a cellular telephone network or an MSAT network, there are fringe areas where mobile users may need both the cellular telephone network and the MSAT in order to insure consistent and reliable coverage at all times. In these areas, a user would need both a mobile terminal apparatus devoted to the cellular network and another mobile terminal apparatus devoted to the MSAT in order to enjoy adequate communication capabilities. Additionally, at any given location in a fringe area, the user without trial and error, would not know whether a communication would be successfully completed over the cellular telephone network or the MSAT. Even if the user were successful in selecting the proper system, a change of location could cause either the cellular or the MSAT to drop a call. This, of course, is not only a nuisance to both parties involved in a particular communication, but the requirement to initiate a new call over the alternate communication network can also be expensive.

In light of the forgoing, there is need for a mobile terminal apparatus that substantially obviates one or more of the problems due to limitations and disadvantages of the related art.

SUMMARY OF THE INVENTION

Accordingly, the present invention is directed to a mobile terminal apparatus and method that permits a user to communicate in the alternative over both the cellular network and MSAT network and provides seamless handoff to the MSAT network when operating in the cellular network.

Additional features and advantages of the invention will be set forth in the description which follows, and in part will be apparent from the description, or may be learned by practice of the invention. The objectives and other advantages of the invention will be realized and obtained by the apparatus and method particularly pointed out in the written description and claims hereof as well as the appended drawings.

To achieve these and other advantages, and in accordance with the purpose of the invention, as embodied and broadly described, the invention is a mobile terminal apparatus that has a transceiver assembly including a cellular network transmitter/receiver and a satellite network transmitter/receiver for at times sending and receiving RF signals over both the cellular and satellite networks; a user device for receiving and/or introducing telephonic information to the transceiver assembly; and a central processor coupling the user device to the transceiver assembly. The central processor includes means to selectively couple the user device to the transmitter/receiver of both cellular network and the satellite network in the alternative for communicating over the selected network. The central processor also includes means for monitoring status messages of both the cellular network and the satellite network simultaneously.

In another aspect, the present invention is a mobile terminal apparatus that has a transceiver assembly including a cellular network transmitter/receiver and a satellite network transmitter/receiver for at times sending and receiving RF signals of both the cellular and satellite networks; a user device for receiving and introducing telephonic information to the transceiver assembly and a central processor coupling the user device to the transceiver assembly. The central processor includes means for effecting a handoff of a call in progress over the cellular network to the satellite network at times when the signal being received by the cellular receiver falls below a threshold value.

In still another aspect, the present invention is a mobile terminal apparatus that has a transceiver assembly including a cellular network transmitter/receiver and a satellite network transmitter/receiver for at times sending and receiving RF signals of both the cellular and satellite networks; a user device for receiving and introducing telephonic information, the user device including a keypad for selecting one of a plurality of operating modes of the terminal apparatus. The apparatus has a central processor coupling the user device and the keypad to the transceiver assembly. The central processor includes means to selectively couple the user device to the transmitter/receiver of both the cellular network and the satellite network in the alternative for communicating over the selected network in accordance with one of the plurality of operating modes entered on the keypad.

In a further aspect, the invention is a method of operating a mobile terminal apparatus having a transceiver assembly including a cellular network transmitter/receiver and a satellite network transmitter/receiver for at times sending and receiving RF signals of both the cellular and satellite networks together with a user device for receiving and introducing telephonic information to the transceiver assembly and a central processor coupling the handset to the transceiver assembly. The method comprises the steps of selectively coupling the user device to the transmitter/receiver of both the cellular network and the satellite network in the alternative for communicating over the selected network, and monitoring status messages of both the cellular network and satellite network simultaneously.

In a still further aspect, the present invention is a method of operating a mobile terminal apparatus that has a transceiver assembly including a cellular network transmitter/receiver and a satellite network transmitter/receiver for at times sending and receiving RF signals of both the cellular and satellite networks; a user device for receiving and introducing telephonic information to the transceiver assembly, and a central processor coupling the user device to the transceiver assembly. The method comprises the steps of effecting a handoff of a call in progress over the cellular network to the satellite network at times when a signal being received by the cellular network from the cellular transceiver portion of the mobile terminal falls below a threshold value.

It is to be understood that both the foregoing general description and the following detailed description are exemplary and explanatory, and they are intended to provide further explanation of the invention as claimed.

The accompanying drawings are included to provide a further understanding of the invention, and are incorporated in and constitute a part of the specification, illustrate one embodiment of the invention, and together with the descriptions serve to explain the principles of the invention.

DESCRIPTION OF THE PREFERRED EMBODIMENT

Cellular Network Overview

Prior to discussing the details of the mobile terminal apparatus of the present invention, the cellular network with which the mobile terminal apparatus will be utilized is first outlined in order to provide a better understanding of the present invention.

A cellular network consists of a network of switches connected to the public switched telephone network (PSTN). These switches mimic the operation of PSTN End Office (EO) switches where calls routed through the PSTN are terminated and connected to the users devices. In the cellular network, all calls involving a cellular mobile phone (unless to another cellular mobile phone on the same switch—MSC) are routed through the PSTN. The call terminates at a cellular Mobile Switching Center (MSC) which controls and connects directly to a network of cells encompassing and defining the region of coverage of the MSC. Adjacent regions of cells are controlled by different MSC's. These cells contain base stations that provide the microwave links to the cellular mobile phone, and trunks to shuttle this information to the MSC. Upon mobile power-up, the cellular phone scans preassigned control channels and locks onto the strongest channel which connects to the MSC through the control channel's base station. If the mobile is registered in a Home Location Register (HLR) database of the MSC, all necessary information is present to allow subscribed features like "call waiting" or "conference calling" to be implemented. If the mobile phone registers as a roamer in a visiting MSC, the visiting MSC will request permission for registration from the home MSC. Then the mobile status is contained in the visiting MSC Visitor Location Register (VLR) database. All PSTN calls which are automatically routed to the home MSC now will be forwarded to the visiting MSC. In response to a call initiation, the serving MSC will allocate an unallocated voice channel from the mobile phones resident cell. The forward and reverse voice channels contain enough bandwidth, to allow transmission of voice and either status control data or Supervisory Audio Tones (SAT) and signaling tones.

As a mobile phone engaged in a conversation travels between cells, a seamless handoff process is required. Once the SAT tones transponded by the mobile phone are received by the MSC with less power than a predetermined handoff threshold, the MSC sends a Measurement Request Invoke message neighboring MSC's using an IS-41 data link. This requests information regarding the serving cell and channel of the mobile phone. The neighboring MSC's then command all cells with proximity to the mobile's cell to read and report the received SAT power level. The neighboring MSC's assimilate the readings and respond with Measurement Request Return Result messages to submit the signal quality of a potential neighboring target cell. The serving MSC then determines a target MSC which contains the cell with the strongest reception. It then sends the target MSC a Facilities Directive Invoke message to indicate the source and destination cells and the mobile phone's identification. The serving MSC also uses this opportunity to allocate the specific voice trunk channel between the two MSCs to establish a connection between the PSTN and target MSC through the serving MSC. The target MSC responds with a Facilities Directive Return Result message which includes an allocated voice channel for the mobile phone and requests the SAT. The serving MSC relays this status information to the mobile on the control portion of its voice channel. The mobile unit then acknowledges with a signaling tone and tunes to the new voice channel. The target cell begins sending SAT on the new voice channel after transmission of the Facilities Directive Return Result message. Once the mobile phone tunes to the new voice channel, it transponds the SAT tone back to the target cell to indicate a successful handoff. This causes the target MSC to send a Mobile-On-Channel message over the IS-41 link to the serving MSC. Upon reception of this message, the serving MSC switches the PSTN connection from the serving cell to the target MSC. The target MSC then allows full voice communication through the target cell to the mobile phone. Communication occurs on this cellular voice channel until the next handoff or until an On-Hook message is received, or loss of SAT occurs.

MSAT Overview

The MSAT network consists of a Feederlink Earth Station (FES) that supplies all communication channels to the mobile phones via a geosynchronous or geostationary satellite and allows communications to the PSTN through a Gateway Switch (GWS) that operates in a manner similar to an MSC of the cellular network. All allocations are controlled by a Network Control Center (NCC) that performs all processing and maintains all control channels. When turning on the unit, the mobile phone first tunes to a default control or signal channel then to alternative control channels at other frequencies, if necessary. Before the mobile apparatus may access the system, it must read and update all system information from the control channel which includes congestion and configuration information. The mobile stores control channel and beam information in its non-volatile memory; and if a new channel is required, the mobile must perform a log-on procedure which tells the NCC the mobile phone's identity and configuration. At this point the mobile phone is ready to make and receive phone calls. This structure of the MSAT system is similar to the cellular system because both contain separate control and communication channels with roaming information passed over the control channels and in-call information multiplexed over the voice channels. The main difference between the cellular network and the MSAT is that MSAT's voice channels cover thousands of square miles with beam overlap eliminating the need for a live-call handoff. Also, voice channels of MSAT use Time Division Multiplexing (TDM) for control data and to replace the SAT tone with a periodically required TDM unique word.

When the mobile phone initiates a call, the called digits are sent with the mobile's identification to the NCC to request a voice channel. The NCC validates the identification number and assigns the voice channel for the mobile phone and the FES completes the call set up. The mobile phone then sends its security key and scrambling vector to the FES to verify database continuity and avoid fraudulent access. The FES and mobile then exchange voice frames containing off hook supervisory information causing the mobile to switch to voice mode. At this point the FES dials the number through the PSTN and receives a response from the PSTN including ringing, busy, or operator recordings. The FES sends the response to the mobile phone which is passed to the user since the mobile phone is in voice mode. An offhook response from the PSTN to the FES causes the FES to change state to "in conversation" and request a similar response from the mobile by sending an answer unique word (UW) on the command portion of the voice frame. Conversation continues between the mobile phones and FES to the PSTN until a call release is issued by either party.

When a PSTN call is routed to the FES, the FES rings back the caller and requests a channel from the NCC which validates the mobile phone's identification number and determines its control channel. The NCC then verifies the mobile phone's availability by sending a call announcement to the mobile phone. The NCC validates the mobile phone based on its response and assigns the voice channel to both the mobile phone and the FES. The mobile phone retunes to the voice channel and sends its scrambling vector and access security key to the FES to be verified and allow secure, non-fraudulent communications. The mobile phone then switches to voice mode and conveys the ringing tone from the FES voice frames to the user. The mobile phone acknowledges the receipt of ringing to the FES and once the user answers the phone, voice frames are sent to the FES with an offhook unique message causing the FES to establish a voice connection between the two users. Conversation continues until a call release is issued by either party. When either the mobile phone determines that the user has hung up or the FES determines that the PSTN user has hung up, an "on hook" message is sent to the voice control channel to request a call termination.

Reference will now be made in detail to the present preferred embodiment of the invention, an example of which is illustrated in the accompanying drawings.

Figure 1:
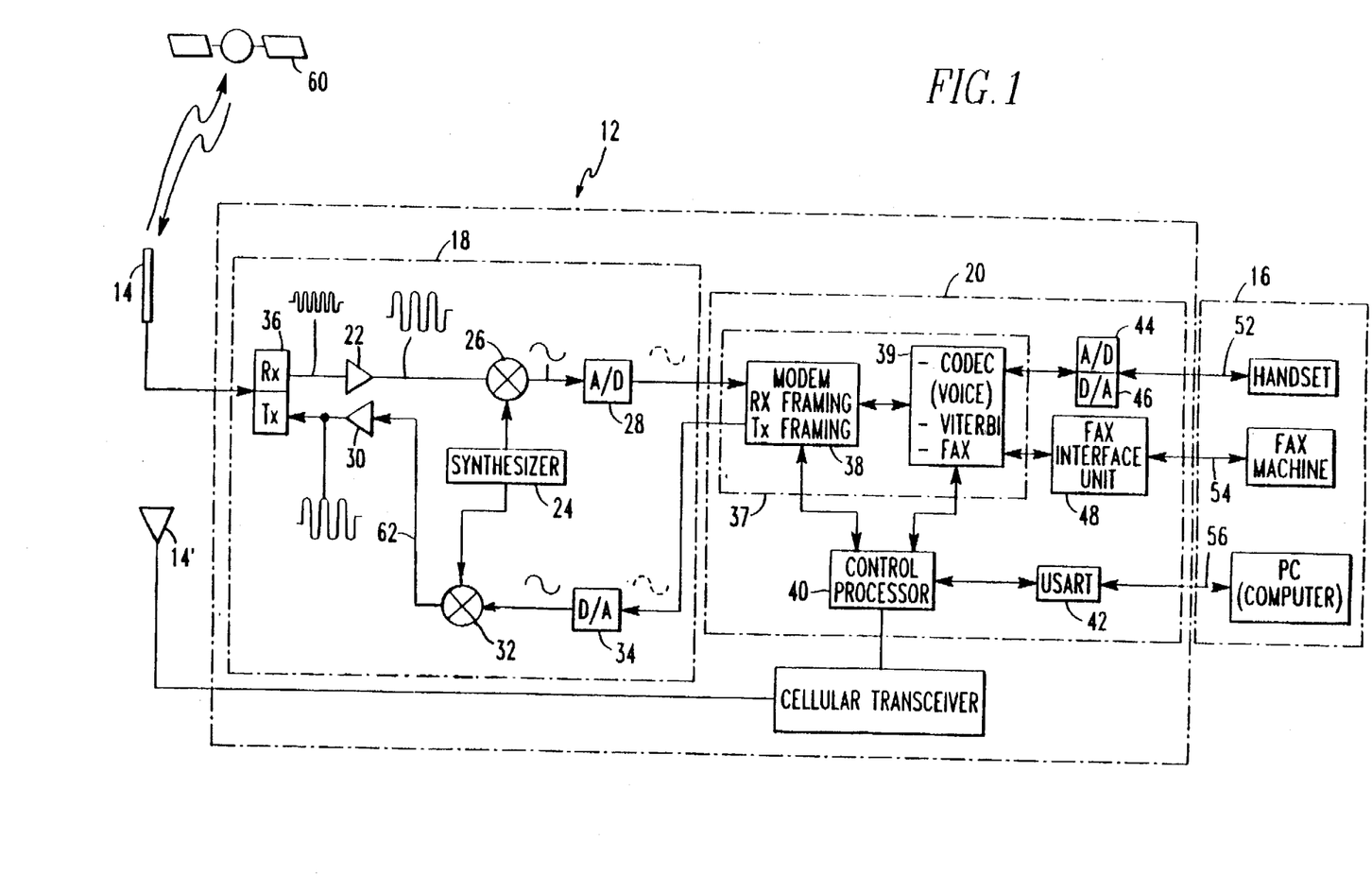
FIG. 1 is a functional block diagram of a mobile terminal apparatus in accordance with one embodiment of the present invention.

The mobile terminal unit of the present invention, comprises a transceiver 12, an antenna 14, and one or more user interfaces 16. The transceiver 12 has an RF section 18 and a processor board 20.

Referring to FIG. 1, the receiver portion includes a low noise amplifier 22, down converter (24) and an analog to digital converter 28. The transmitter portion includes a high power amplifier 30, a mixer 32, and a digital-to-analog converter 34. The antenna 14 is connected to the RF section through a diplexer 36.

The processor board of the present invention has a digital signal processor, a central processor, a universal synchronous/asynchronous receiver/transmitter, and a plurality of analog-to-digital converters and digital-to-analog converters. As herein embodied, a digital signal processor 37 includes a modem 38 and a coder/decoder and fax processor 39, a central processor 40, a universal synchronous/asynchronous receiver/transmitter 42, an A/D converter 44, a D/A converter 46, a FAX interface unit 48. The user interfaces of the terminal unit of the present invention include an input/output 52 for a handset, an input/output 54 for a fax machine and an input/output 56 for connection to a personal computer. The apparatus also includes a cellular transceiver board 59.

The antenna assembly 14 may be one of several different types depending on the particular application of the mobile terminal unit. For land vehicles, antenna options may include an omnidirectional mast and a mechanically steered array. The mobile terminal units also have a cellular transceiver with a second antenna 14' for cellular communication.

The mobile terminal unit of the present invention may be used with a geosynchronous satellite, such as 60, which has broad beam coverage over the geographical regions in the satellite antennas pattern. The mobile terminal unit, hereafter referred to as the MT, transmits and receives energy to and from the satellite respectively through the one antenna 14. The most dominant feature of the satellite communication link between the satellite 60 and the antenna 14 is the extremely low satellite power that is received. The satellite 60 is assumed to be traveling in an orbit 22,840 miles above the equator, and energy traveling this distance to the MT undergoes huge attenuation, such that power flux density incident at the MT antenna is approximately −135 dB Watts/Meter^2, or approximately $10^{-14}$ watts per square meter as previously mentioned.

An L-Band signal which may be of a frequency between 1525 to 1550 MHz, is received through the MT antenna 14 and passed into the MT RF section. Since the MT transmit and receive signals may be simultaneously present, or operate in a full duplex fashion, at the antenna, they are separated into their respective paths by the diplexer 36. The diplexer employs a dual bandpass filter with one filter tuned to the transmit band and the other filter tuned to the receive band of frequencies. Thus, the diplexer directs the receive signal into the receive path. The signal exits the diplexer and is then amplified by the low noise amplifier 22 before it passes into the next RF stage. The low noise amplifier 22 boosts the power level of the original signal and sets the noise level of the receiver. In other words, the amplifier 22 establishes the noise figure of the MT receiver. The amplified L-Band receive signal exits the low noise amplifier 22 and is mixed down or in other words down converted to a low intermediate frequency (IF) signal by the down converter 24 and then sampled by an analog-to-digital (A/D) converter 28. This provides an output in the form of digitized IF waveform samples to the processor board 20.

The transmit signal begins in the processor board 20 as digital data, which is then converted into digitized, modulated waveform samples. This digitized waveform, which is created by the processor 37 is conducted to the digital-to-analog (D/A) converter 34 before the quadrature modulator upconverter 32 of the RF section. The converter 34 converts the digitized waveform into both an analog I (in phase) and Q (quadrature) waveform. The analog I and Q waveforms are then sent to the mixer or upconverter quadrature modulator 32 where they are upconverted to L-Band, and then summed to form a low power L-Band transmit signal on line 62. This low level L-Band transmit signal is amplified by the high power amplifier 30. The resulting high level L-Band transmit signal then passes through transmit side of the diplexer 36 and is steered towards the MT antenna 14 from which it travels to the satellite 60.

In operation, the DSP 38 reads the received signal waveform samples from the A/D converter 28, and processes these samples as they arrive. The L-Band receive signal must be mixed down to the low IF frequency to aid in signal filtering and also to slow down the A/D sample rate so that the digital signal processing can keep up with the sample arrival rate. Once the receive signal has been sampled and loaded into the DSP 38, all subsequent signal processing is performed by the DSP 38 and 39 as controlled by the control processor 40. Received signals are demodulated, in other words translated from their waveform representation into their digital data representation, decoded and packaged for voice, fax or data processing at the DSP 39. The signal degradations of the high altitude satellite are mitigated by the channel protocol and data encoding scheme herein described. For example, repeat strategies, a combination of forward error correction, interleaving and scrambling, all aid in minimizing and spreading the effect of errors on the channel. The demodulator of the digital signal processor 38 achieves signal acquisition and tracking under degraded receive signal conditions. All of these functions are implemented in software within the processor board of the MT.

The control processor 40 performs byte level manipulations and the DSP's 38 and 39 perform bit level and waveform manipulations. The DSP 38 implements the modem as well as the real time satellite framing function that includes circuit switched, packet switched and signaling frame formats together with low level bit manipulation algorithms. An executive provides overall control and call sequence around which the processing functions are built. Interrupt Service Routines (ISR) are used to feed the signals from the DSP 38 to the DSP 39, and from the DSP's 38 and 39 to Control Processor (CP) 40 communication interfaces. The DSP 39 contains the Codec, Viterbi, and Fax protocol functions.

Operational Mode Description

Figure 2:
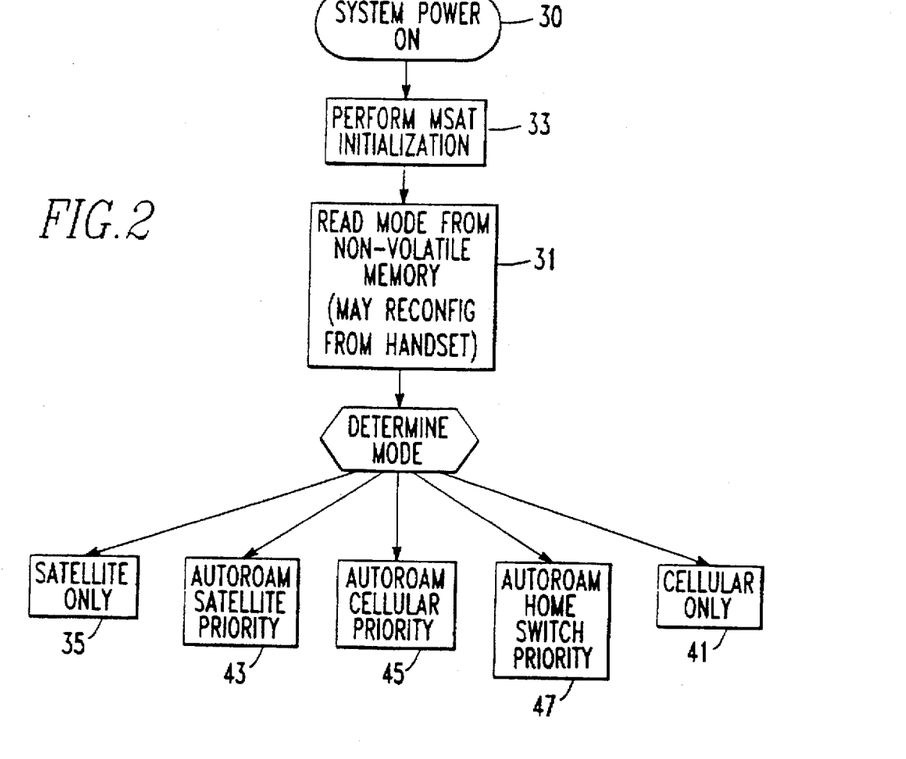
FIG. 2 is a flow chart illustrating the various operating modes of the mobile terminal apparatus of FIG. 1.

Referring to FIG. 2, the mobile terminal hereinafter referred to as MT has a switch for turning the power on to the transceiver and the central processor (not shown). Upon switching the power on at step 30, the subsystems of the MT turn on, including the central processor 40 and the cellular transceiver described in connection with FIG. 1. However, neither the cellular network nor the MSAT network may transmit at this time. After the user turns on the MT, the MT performs a built-in test (BIT) sequence and selects a usable satellite beam and control channel. This provides the usability status of the MSAT and the usable Group Controller Signaling channel (GC-S) which is the control channel responsible for sending information from the ground station of the MSAT network to the mobile terminal (MT). This procedure is referred to as performing MSAT initialization as indicated at block 33. The central processor 40 referred to above includes non-volatile memory (NVM) that includes variables indicating a user selectable inter-operability mode which is input at block 34 after initialization is complete and BIT is successful at block 33, the central processor reads the selected inter-operability mode (I-mode) from the NVM of the control processor. The I-mode value is downloaded from the non-volatile memory of the processor to block 31 where the mode is determined. The central processor 40 is configured to run the inter-operability mode module as needed, a re-registration timer variable is set to the current timer value upon entering an operating mode, and all variables and flags are initialized.

In accordance with the invention, the mobile terminal apparatus that includes the central processor for coupling a handset with a keypad to a transceiver assembly, the central processor includes means to selectively couple the handset to a transmitter/receiver of both the cellular network and the satellite network for communicating over the selected network in accordance with one of a plurality of operating modes entered on the keypad. As herein embodied, and referring again to FIG. 2 the inter-operability modes include a mode 35 for permitting communication over MSAT only, and a mode 41 for communicating over the cellular network only. In addition, the central processor includes a mode that provides priority to the MSAT network, but is also capable of selecting the cellular network as indicated at 43. As shown at 45 of FIG. 2 the central processor includes an operating mode that gives priority to communicating over the cellular network but also provides for effecting a handoff to the MSAT network when required. An operating mode is indicated at 47 that provides for giving priority to the home switch of the cellular network in which the mobile terminal is registered.

Satellite Only Mode

Figure 3:
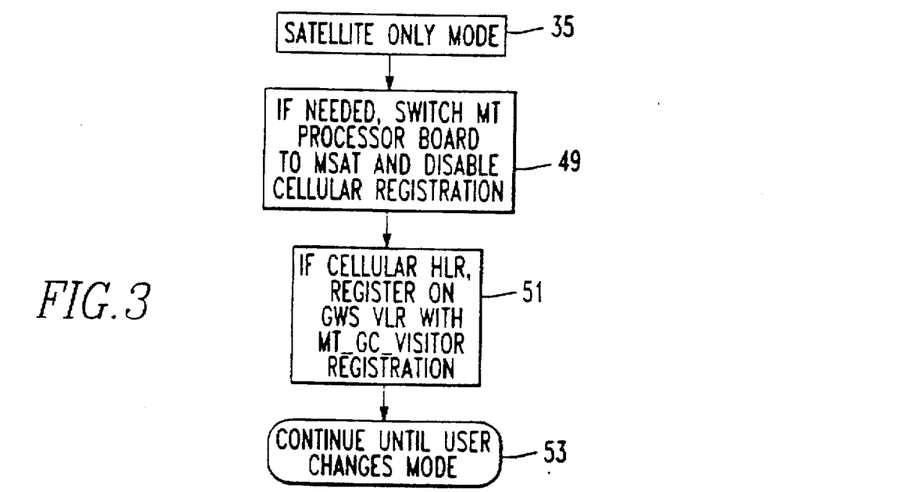
FIG. 3 is a flow chart illustrating the apparatus in an operating mode for communicating over the satellite network only.

As shown in FIG. 3, in the satellite only mode 35, the MT central processor is switched to the MSAT network if necessary and the cellular registration is disabled as indicated at block 49. In implementing block 49, a voice bus from the MSAT and the cellular network are multiplexed to the user handset via the central processor 40. Thus, the cellular transmitter is disabled and the voice bus from the user handset is connected to the MSAT network. Consequently, the mobile phone will not be able to register on the cellular network. The MT device has its Home System Identification (SID) stored in the NVM along with the satellite beam number and the signaling channel number. If the home SID corresponds to the gateway switch GWS, the MT is able to operate in the MSAT mode only. However, if the home SID corresponds to a cellular MSC, the MT is cellular compatible. All cellular compatible MT's have cellular home SID's in the present embodiment of the invention. If the MT is cellular compatible, the mobile phone must register on the Visitor's Location Register (VLR) of the gateway switch GWS and de-register from any cellular MSC. This procedure is accomplished by the switching network after the MT sends a GC registration request to the network control center NCC over the GC-S of the satellite system as indicated at block 51. Thus, a PSTN originated call, which would originally have been routed to the home MSC of the cellular system will be routed to the Gateway Switch (GWS) of the MSAT. Therefore, the MT is registered on the VLR of the gateway switch from the cellular HLR of the MSAT. The MT operates as a visitor over the MSAT system until the user changes the mode by manipulating the keypad of the hand held device as indicated at 53.

Cellular Only Mode

Figure 7:
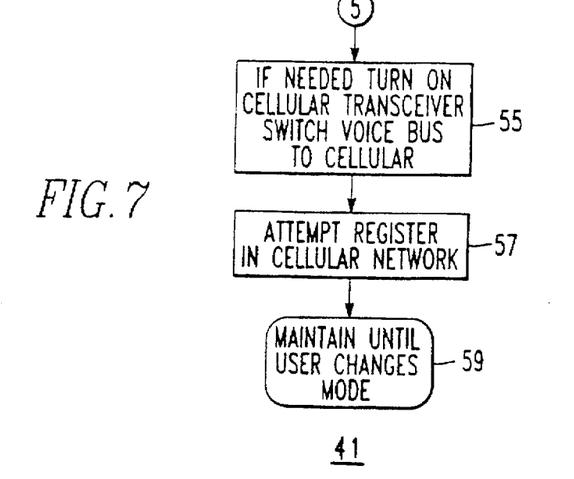
FIG. 7 is a flow diagram illustrating a mode for operating the terminal device in only the cellular mode.

Referring to FIG. 7, if the mobile terminal apparatus is to be operated solely in the cellular mode, after initialization, the cellular transceiver is turned on and the voice bus is switched to cellular as indicated at block 55. An attempt is made to register the mobile terminal in the cellular network as indicated at 57. Assuming that such registration is successful, the cellular mode is maintained until it is changed by the user as indicated at 57.

Autoroam Satellite Priority

In this particular mode, and in accordance with the present invention once the mobile phone is powered up, it attempts to operate in MSAT. If all attempts to obtain a control channel fail or the MSAT refuses service based on the mobile's status or erroneous operation, the mobile phone automatically switches to cellular operation. If the mobile phone attempts to make a phone call and cannot obtain a voice channel, it automatically switches to cellular mode and attempts the same phone call over the cellular network. Finally, if the mobile phone is roaming and notices a loss of access to the control channel, it will attempt to find a new control channel, and if none exists it will register on the cellular network. Once in the cellular system, the mobile phone will continually monitor the MSAT control signals and will periodically attempt to re-register on MSAT if a control channel is present. Registration and re-registration is possible between these two systems because the GWS appears to be another MSC to the cellular network. When using MSAT, the HLR thinks that the mobile phone is in a VLR. When communications are lost with the satellite, the cellular transceiver attempts an autonomous registration which is received by the resident MSC and sent to the HLR. The HLR previously registered the mobile phone with the VLR in the Gateway Switch (GWS). Then the HLR updates the database with the location of resident MSC to allow all phone calls to be routed to this MSC rather than the GWS. The HLR treats the whole operation as if a cellular mobile phone just traveled from the coverage of one MSC to another. When the satellite coverage returns, the cellular portion of the mobile phone stops operating, and the mobile phone registers with MSAT. This causes the GWS to send a registration notification to the HLR to re-register the mobile phone with the VLR of the GWS. This process also appears to be a cellular autonomous registration to the HLR. At this point, all calls will be rerouted to the GWS from the HLR.

If a mobile phone roams into cellular coverage, and then initiates a phone call, the MSC will determine network coverage. If the cellular call begins to fade, a seamless in-call handoff back to MSAT may be initiated. The details and occurrences of this seamless handoff are subsequently described.

While the satellite portion of the mobile phone is registered on the MSAT, the cellular portion of the mobile phone cannot independently register on an available MSC. This would cause the HLR to believe a mobile phone is fraudulently accessing the cellular network. From the HLR's point of view, the mobile phone is registered in one VLR (the GWS) and another mobile phone is trying to use the same mobile identification to register on another MSC. At this point, the home MSC would cancel both registrations. Without being able to register in the cellular network while being registered on MSAT, handoff from MSAT to cellular is not feasible because the cellular network has no idea where the mobile phone is located or with which cell to establish registration. Consequently, MSAT to cellular in-call seamless handoffs are not feasible without significantly changing the operation of the cellular network. To avoid this problem, once a call is in progress on the satellite, no seamless handoffs to the cellular network are allowed. Instead, if satellite coverage wanes during a phone call, the call will be dropped and then the mobile phone will autonomously register on the cellular network.

Figure 4:
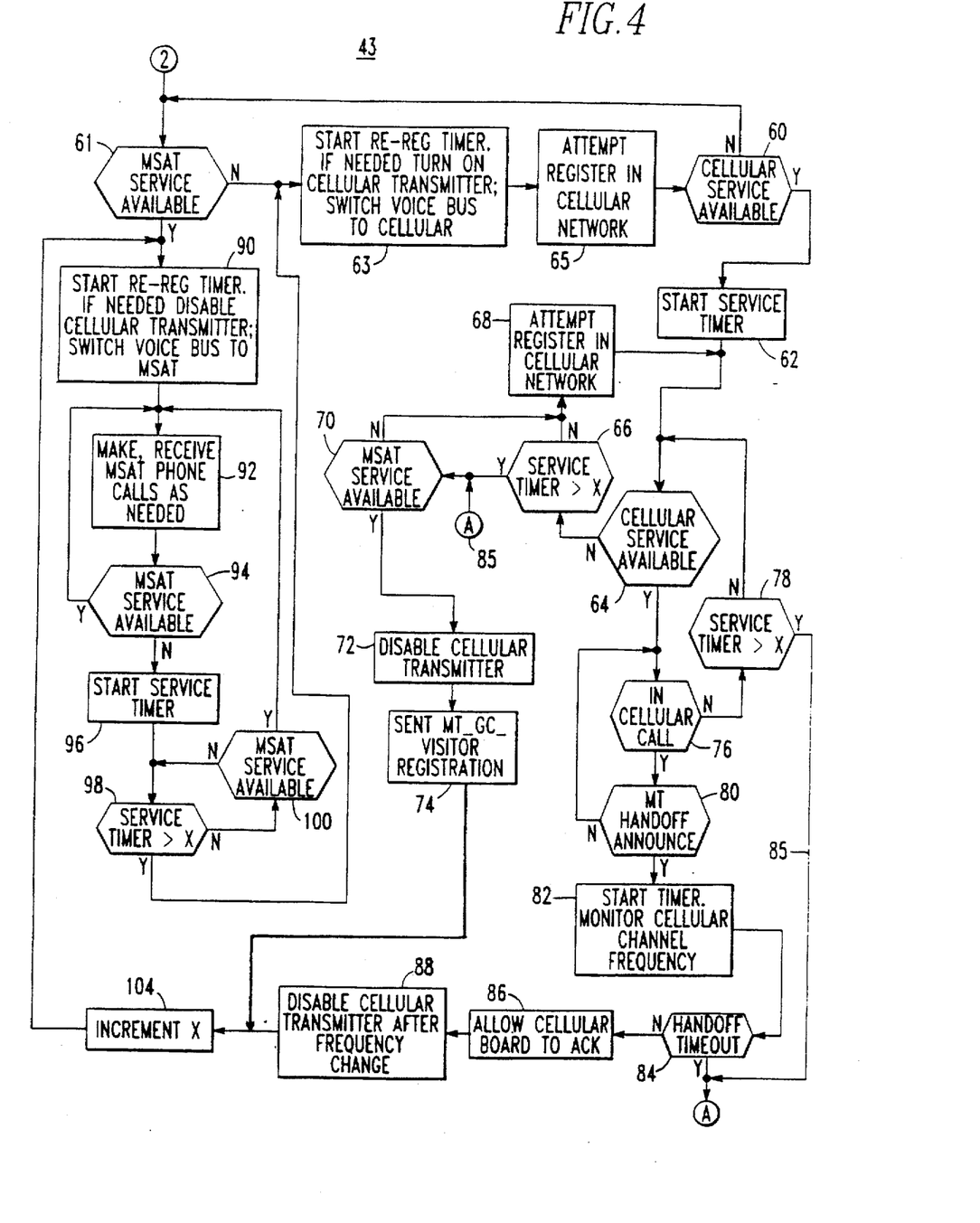
FIG. 4 is a flow chart illustrating an operating mode for communicating over both the cellular and satellite networks with the satellite network given priority.

As herein embodied, and referring to FIG. 4 the auto roam satellite priority operating mode 43 is described. After initialization, as described in connection with FIG. 2, the control processor determines at block 61 whether or not MSAT service is available. In determining whether or not service is available, the status of a GC-S channel or channel FES and its bit error rate (BER) is monitored to determine whether there is service denial from MSAT. If not engaged in a call, the (BER) is monitored on the GC-S channel and if in a call, the bit error rate (BER) is monitored on the FES channel. If the BER is beyond system tolerances, or the MSAT sends a service denial SU, the MT changes its status to service denial. Thus, if service is denied the re-registration timer is started, if needed, to turn on the cellular transmitter. The voice bus is then switched to cellular at block 63. An attempt is made to register the mobile terminal in the cellular network at block 65. If cellular service is available as indicated at decision block 60, the service timer is started for the first stage at block 62. If not, the flow chart loops back to block 63 to again try to determine if MSAT service is available. After the service timer is started at block 62, decision block 64 determines whether cellular service is available. If cellular service is not available at block 64, a determination is made at block 66 as to whether the elapsed time of the service timer is greater than X, which is the time limit for stage zero (6 seconds) of the state table (See FIG.

Figure 9:
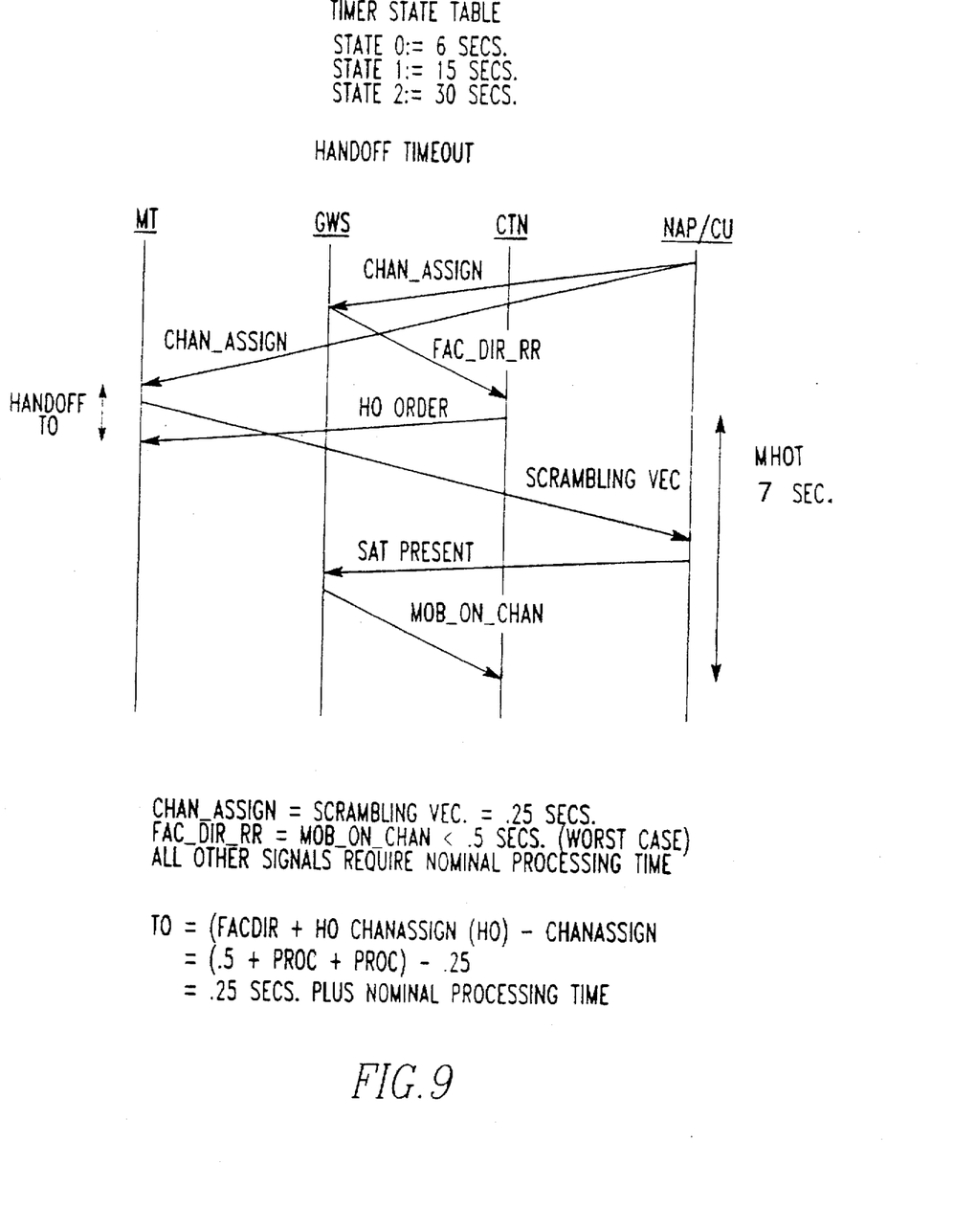
FIG. 9 is a ladder diagram illustrating a handoff time-out of the present invention.

9). If the time has not yet expired an attempt is made to register in the cellular network at block 68. To register in the cellular network, the control processor sends a registration signal to the cellular transceiver to cause initialization and registration in the resident MSC in response to a cellular mobile log on signal. If cellular service is not available as determined by decision block 64, the cellular board sends a no service message to the handset which is intercepted by the central processor in response to a "no service" signal. If cellular service is available as determined by block 64, the control processor 40 monitors the call set up and terminate messages at block 76 to determine whether a cellular call is in progress in response to a call set up and termination signaling messages. If the cellular system is not in an in-call status, the service timer is again checked at block 78; and if the time has not expired, cellular service availability is again checked at decision block 64.

In accordance with the present invention, the central processor comprises means for effecting a handoff of a call in progress over the cellular network to the MSS satellite network at times when the signal being received by the cellular receiver falls below a threshold value. As herein embodied, the central processor monitors the calls in progress to await a handoff announcement as indicated at decision block 80.

In response to an MT handoff announcement, the timer value is stored or a timeout is reached at block 82. At block 84, the central processor monitors the time that has elapsed from the reception of the NCC channel assignment over the GC-S of the MSAT until the cellular frequency changes to a new "false" or "inert" frequency. The "false" frequency changes from cell to cell and is a frequency that is generated by one or more MSC's of the cellular system which the cellular system does not use for cellular communication or control in the resilient cell or any adjacent cells. To conform to mobile handoff (MHOT) timeout parameter, the time elapsed between the reception of the NCC channel assignment over the GC-S and the changing to the false frequency must be less than five seconds. If it is greater than five seconds, an output occurs on line 85 of FIG. 4 and the MSAT is monitored to determine whether or not service is available at decision block 70. However, if the handoff is within the time limits, the cellular transceiver is allowed to acknowledge to the serving MSC at block 86 that the MT has successfully received the new "false" cellular channel within the required time period of five seconds. Thus, by waiting four seconds after the change of frequency to the false frequency to disable the cellular transceiver, the cellular serving MSC will transfer the PSTN connection to the GWS of the MSAT network. This terminates the cellular usage of the mobile terminal apparatus of the present invention.

Figure 8:
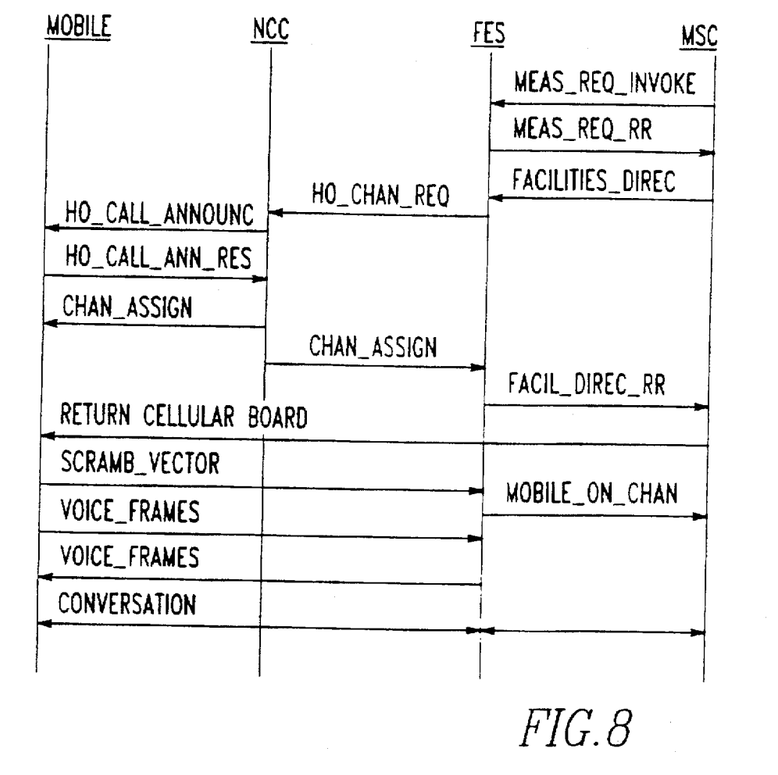
FIG. 8 is a ladder diagram illustrating a cellular to satellite system handoff in accordance with the present invention.

To describe the cellular board acknowledgment at block 86 more specifically, it should be understood that once the MT MSAT transceiver receives the channel assignment from the NCC which occurs when the system is first initialized, this message is passed to the control processor to permit the MT to prepare to switch voice transmission from the current cellular channel to the assigned MSAT communication channel. The control processor waits 15 seconds for the cellular handoff order at function block 82, which exceeds the anticipated operating time as indicated in connection with the description of FIG. 8. The cellular board of the MT ignores this MSAT signaling and timing. When the cellular board receives the handoff order at decision block 80, the new cellular false frequency assignment is passed to the central processor, and the cellular board transmits a signaling tone on the former cellular frequency for a short time period as required by IS-553. The cellular board then tunes to the cellular "false" frequency and waits for the supervisory audio tone to be transmitted over this new "false" frequency. During this time, the FES of the MSAT system is awaiting the scrambling vector from the MT which has comparatively large period of time over which it may be received.

As indicated at function block 88, the cellular transmitter is disabled after the frequency change. This occurs after allowing four seconds for the cellular board to acknowledge the serving MSC. The cellular transmitter must be disabled within five seconds to disallow any autonomous registrations on the cellular network which would replace the GWS connection. Upon receiving the handoff order at decision block 80, the cellular board is designed to expect the SAT on the newly assigned channel within five seconds or the board will terminate the call and begin scanning the cellular spectrum for an available cellular control channel. To avoid this, the MT central processor uses the newly received cellular "false" frequency as a trigger for an internal timer as indicated at function block 82. Once this timer reaches four seconds, the cellular board is disabled. This four second time interval permits the cellular board to send its signaling tone to the MSC on the previous cellular channel to convince the MSC that the MT is proceeding to the new cellular switch, which is actually the GWS of the FES of the satellite system. Additionally, the timer is less than five seconds to avoid the possibility of the cellular board terminating the call that is being handed off.

In order to provide insight into the requirements of the MSAT system, reference is made to FIG. 9 which is a ladder diagram to illustrate the event which must occur in the MSAT system to avoid a mobile handoff timeout (MHOT) when affecting a handoff from the cellular to the MSAT network. The timer state table provides for three separate states of the MSAT and cellular networks. The zero state occurs when the TM is first powered up. This state requires that a re-registration cannot be attempted for changing between cellular and MSAT networks for a period of six seconds. If neither the MSAT or cellular network is available after the first try, the system goes into a "one" state which requires an elapsed time of 15 seconds before a re-registration can occur if neither the cellular or MSAT network is available. After two tries for availability, the system goes into a "two" state which prevents a re-registration from one network to the other until after 30 seconds has elapsed. This permits a mobile terminal to attempt to find an available network or channel in a network without ping ponging continually back and forth after the first and second failures.

During a handoff from the cellular network to the MSAT network, the cellular network is unaware of the status of the MSAT network. Thus, the handoff must be synchronized for the various events to occur within the requirements of both systems. For example, the first indication that the MSAT has that a handoff is to occur is the reception by the control processor of the "false" frequency. Upon such reception, the control processor retunes to this "false" frequency, which triggers a timer for the sequence of events required by the MSAT network. As shown in FIG. 9, a network access processor channel control unit (NAP/CU) of the network control center (NCC) and FES of the MSAT network provides a Channel Assignment to the GWS and the MT. In response to the reception of the Channel Assignment by the GWS, a Facilities Directive Return Result message, which includes an allocated voice channel for the mobile phone, and a request for a SAT to be transmitted to the cellular telephone network (CTN). Upon receiving the Channel Assignment, the MT sends a scrambling vector to provide identification to the NAP/CU and the GWS receives and returns a SAT. The handoff order is transmitted to the MT after the CTN receives the Facilities Directive Return Result previously described. After the GWS receives the SAT, a Mobile On-Channel directive is sent to the CTN indicating that the handoff is successful. The time elapsed for the receipt of the Channel Assignment by the MT to the receipt of the Scrambling Vector by the NAP/CU is approximately one-quarter of a second. The worst case for the time between the receipt of the Facilities Directive Return Result by the CTN to the receipt of the Mobile On Channel invoked by the CTN is one-half second.

Referring again to FIG. 4, if decision block 63 indicates that MSAT service is available, the re-registration timer is started at function block 90. If necessary, the cellular transmitter is disabled and the voice bus is switched to MSAT if not already in such a configuration. The MSAT phone calls then are made and received as needed as indicated by function block 92. When MSAT service becomes unavailable as indicated by decision block 94, the service timer is started at function block 96; and if the service timer shows an elapsed time less than is required for the particular stage as described in connection with FIG. 8, the MSAT service availability is again determined at decision block 100. If the time has expired according to the particular state of the system, then the re-registration for the cellular transmitter is started over line 102 at block 56. Once the cellular transmitter is disabled after the handoff at function block 88, the time is incremented to the next stage at function block 104. Also, this time is incremented after the visitor registration has occurred at function block 74. Thus, the state is incremented from the zero to the second state after each registration of the MT or after the disabling of the cellular transmitter following a handoff.

Auto Roam Cellular Priority

The present invention also includes a mode which permits a cellular user to fortify communications capabilities by allowing regular cellular operation with a satellite fall back if cellular coverage degrades. This mode permits roaming analysis and registration similar to the apparatus of the MSAT priority with cellular backup described in connection with FIG. 4. However, this mode also permits a seamless call handoff from cellular to MSAT during a phone call as cellular coverage wanes. Thus, the user, who typically will have cellular coverage but desires overlap to patch the gaps in the cellular network can maintain continuous communication coverage. This mode uses the same principles as the satellite priority mode described in connection with FIG. 4 except the cellular service has priority, so if cellular coverage wanes and the mobile phone reverts to MSAT, the cellular coverage is periodically tested to determine the ability of the MT to re-register in the cellular system. The process of registering on the cellular network is the same as with the satellite priority mode. The only difference is that the mobile phone will attempt registration on an MSC before resorting to a GWS.

In accordance with the present invention, this mode also offers seamless call handoff. Since internal MSC cells have coverage overlap, any situation extensive enough to cause a cellular call to be dropped would not allow a seamless handoff to MSAT; whereas, the MSC's border cells present a situation where a mobile phone gradually leaves coverage. Consequently, the MSC is equipped with provisions, including "false" cellular handoff channels to provide seamless handoff from these border cells when cellular coverage is waning and another cell cannot receive the handoff. These false channels are cross referenced with each border cell such that the channels are considered acceptable by the MSC but are used by cells distant enough from the serving cell to avoid any possible contention during the handoff process.

Figure 5:
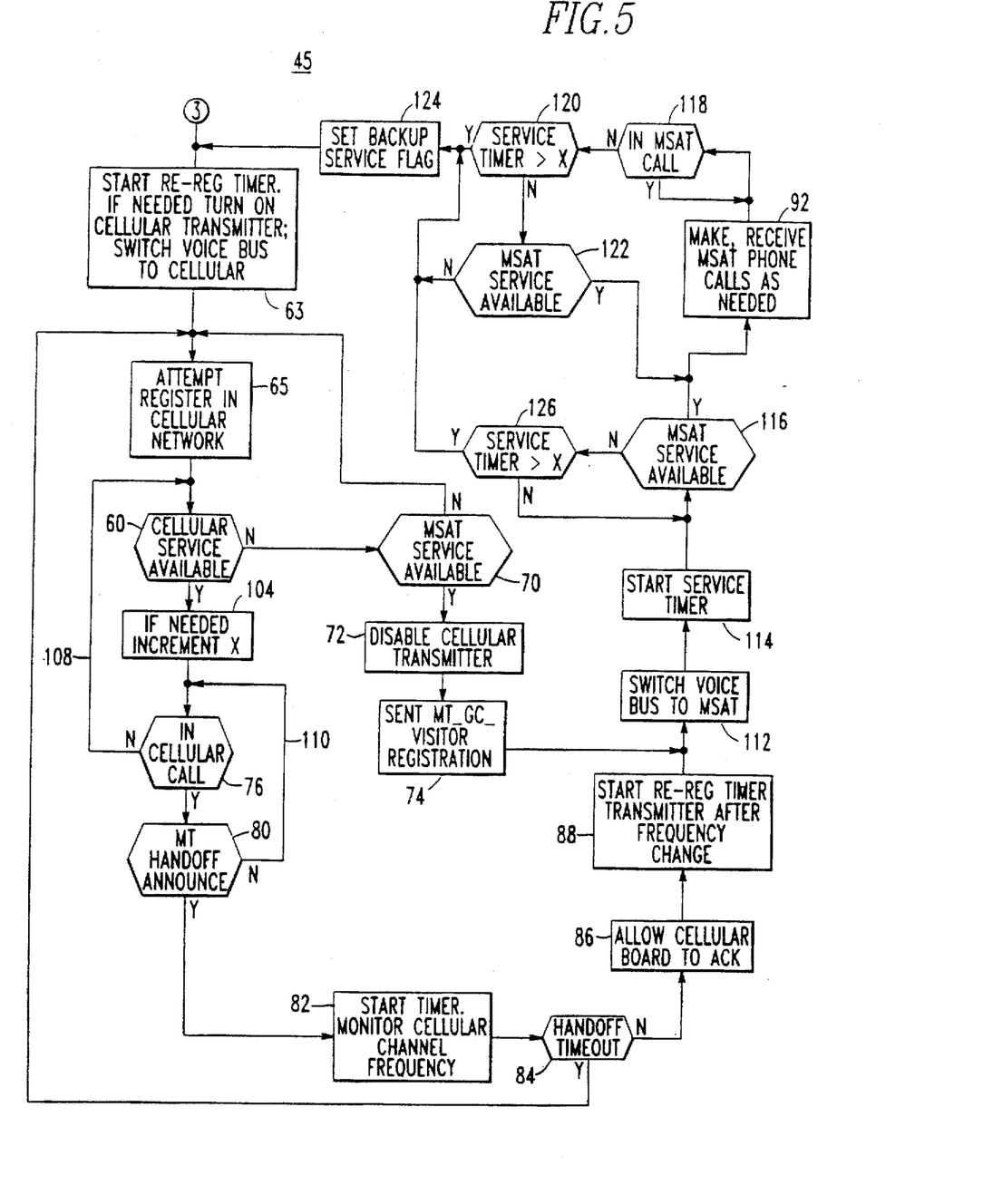
FIG. 5 is a flow diagram illustrating an operating mode giving priority to the cellular network.

In describing FIG. 5, which illustrates one embodiment of the operating mode 45, similar reference numerals are used for like functions. Thus, in describing FIG. 5 for the sake of brevity, such similar functions will not be repeated, but only the arrangement of the various function blocks and decision blocks will be described, with the differences between FIG. 4 and FIG. 5 emphasized.

As shown in FIG. 5 after power up, the re-registration timer is started at function block 63 and if needed, the cellular transmitter is enabled and the voice bus is switched to cellular. An attempt is made to register the call in the cellular network at function block 65 and at decision block 60, it is determined whether or nor cellular service is available. If it is available, the state of the system is implemented to the next stage at block 104; and a determination has been made as to whether or not a cellular call is in progress at decision block 76. If one is not in progress, block 76 loops back on line 108 for determining cellular availability, implementing the state to the next higher state at block 104, and again determining if a cellular call is in progress at decision block 76. This looping continues until 76 determines that a cellular call is in progress; and then a decision is made at block 80 as to whether or not a handoff has been announced for the MT. Iteration of this loop over line 110 occurs until such time as a handoff announcement has been made. Once a handoff announcement has been made, the timer is started and the cellular channel frequency is monitored at function block 82. A handoff timeout is determined at decision block 84. The cellular transceiver is allowed to acknowledge to the serving MSC that the MT successfully received the new "false" cellular channel within the five second period. Thus, by waiting four seconds as previously described to disable the cellular transceiver, the cellular serving MSC will transfer PSTN connection to the GWS. The detailed function and cooperation of the function and decision blocks 82, 84, 86, and 88 have been previously described in connection with FIG. 4. Instead of incrementing X at function block 104 as is the case with FIG. 4, the voice bus is switched to MSAT at function block 112. In this function block, the control processor 40 connects the voice path between a user interface of the mobile terminal handset and the MSAT transceiver instead of the user interface and the cellular transceiver. The current timer value is stored for future comparison upon reaching the function block 114. Then decision block 116 is querying to determine whether or not MSAT service is available; and if so, the MSAT calls are made and received as needed at function block 92. This status continues until it is determined that a call on MSAT is not in progress. If the service timer at decision block 120 has not timed out in accordance with the particular state of the system, or in other words greater than the time X then at the decision block 122; it is again determined whether or not MSAT service is available. If the timer is greater than X for the particular stage, then the backup service flag is set at function block 124, which indicates to the system that there has been at least one transfer from cellular to MSAT since the mobile terminal apparatus was initialized. Also, if MSAT service is unavailable as determined at decision block 116; and the service timer is greater than the particular state of the system at decision block 126, the backup service flag is set at 124.

In the event that cellular service is not available as determined at decision block 60, prior to any handoff in the system; and it is determined at decision block 70 that MSAT service is available, then the cellular transmitter is disabled and the MT call is registered in the visitor register of the MSAT system at block 74. The system then switches the voice bus to MSAT at function block 112 as previously described. The backup service flag indicates that the operation mode has all ready used the MSAT backup and the re-registration timer is again started after the time has elapsed that corresponds to the particular state the system is in at function block 56. This again gives priority to the cellular transmitter and switches the voice bus to cellular after it has been determined at decision block 118 that an MSAT call is not in progress. Thus, in accordance with the operating mode of FIG. 5, the system always switches back to give priority to the cellular network, after termination of a call, whether it be an MSAT call or a cellular call. It is only during a call that the cellular system hands-off to the MSAT system.

Auto Roam Home Switch Priority

This mode is similar to the cellular priority described in connection with FIG. 5 except that roaming in a visiting MSC of the cellular network is avoided. In accordance with the invention, the mobile phone monitors its location, and if it is roaming and notices a pending registration on a visiting MSC of a cellular network, the mobile phone will cease cellular activity and register on the MSAT. Consequently, the user will minimize cellular roaming charges and still enjoy continuous coverage. The mobile terminal apparatus of the present invention periodically samples the cellular network to determine whether it has returned to the home MSC. If so, cellular registration will be reinitiated. If the MT leaves the home location register during a phone call, the home location register will request a handoff to a VLR as well as to the MSAT. This is similar to the regular cellular priority mode in order to minimize call disruption. If registered in the VLR upon completion of the call, service is immediately transferred to MSAT. Thus, this mode has roaming functions in accordance with the invention but operates similar to the standard cellular priority mode 44 during a call.

Figure 6:
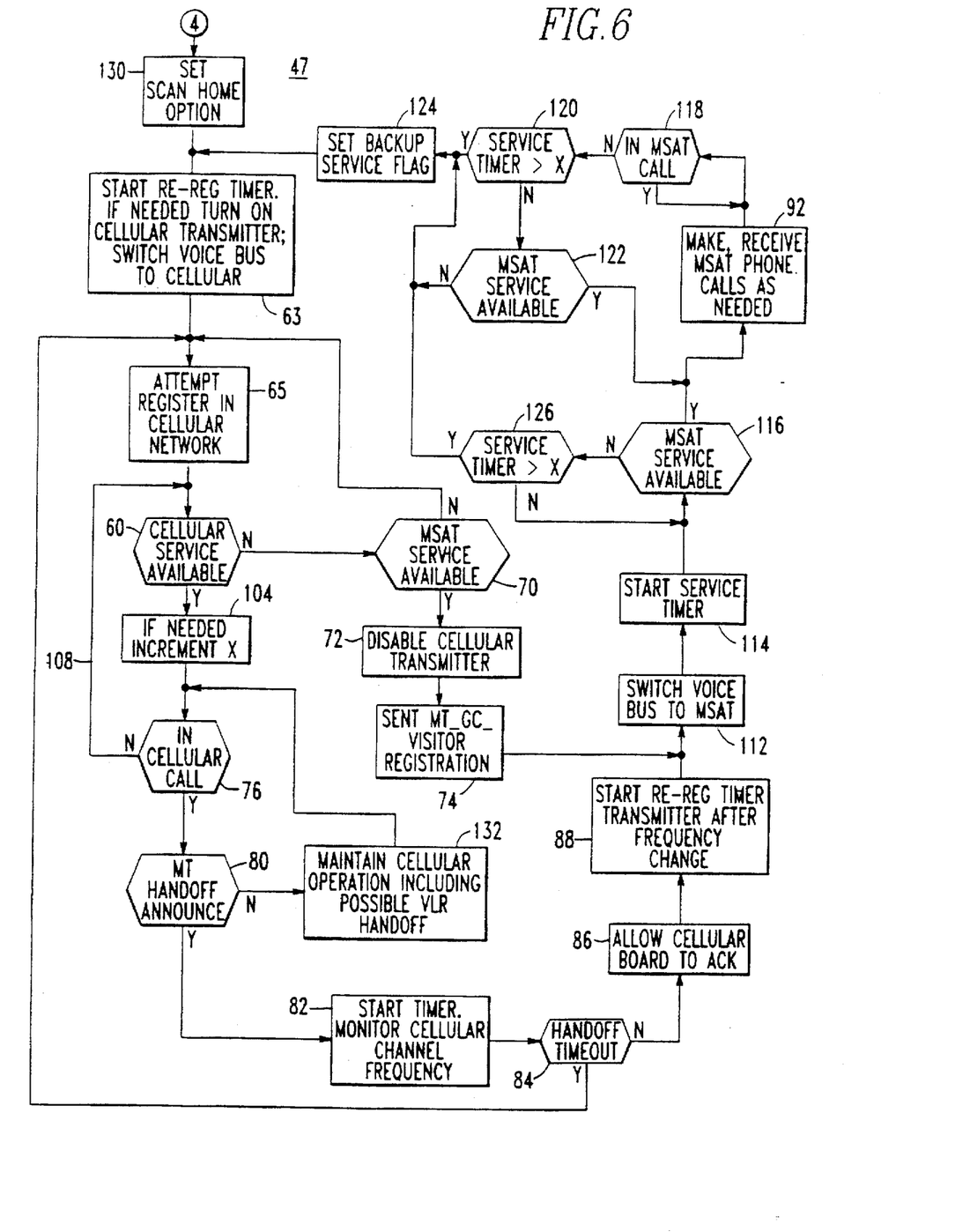
FIG. 6 is a flow diagram providing priority to the resident home switch of the cellular system.

Similar to FIG. 5, the function blocks and decision blocks of FIG. 6 which have a function similar to those of FIG. 5 and FIG. 4 will bear similar reference numerals. In order to minimize repetitiveness, the description of FIG. 6 will be confined to the differences between this operating mode 47, and the previously described operating modes.

As herein embodied, upon entering mode 47 at function block 130, the central processor obtains the "Scan Home" code word from NVM and sends the code word to the cellular transceiver to disable any possible registrations on a visitor location register (VLR) switch. The MT still permits seamless call handoffs to a VLR but will terminate cellular service with a "no service" indicator upon call completion. Before exiting mode 47, the "Scan Home" at block 124 must be disabled. Similar to the mode 45 described in connection with FIG. 5, the re-registration timer is started, and if needed the cellular transmitter is enabled and the voice bus is switched to cellular at function block 63. Also, an attempt is made to register the call in the cellular network at function block 65 and a determination is made as to whether or not cellular service is available at decision block 60. If there should be more than one attempt to handoff from one network to another, the state of the system is increased as previously described to maintain service with each of the networks at least six seconds for the zero state, 15 seconds for the one state, and 30 seconds for the two state as previously described. The difference states are determined by the number of times that the backup service flag is set at function block 124. If a cellular call is progress as indicated at decision block 76, and no MSAT handoff announcement has occurred at decision block 80, the system attempts to maintain cellular operation including possible VLR handoff at function block 132. The function block 132 causes the MT to interact with the cellular network as if it were a regular cellular phone. If in a phone call and leaving home switch coverage, the cellular will handoff to the cellular visiting switch and prepare to transfer to MSAT upon completion of the call. The output of block 132 is the resident MSC location upon completion of the cellular call.

Upon occurrence of a MSAT handoff announcement, a handoff will be affected by blocks 82, 84, 86, and 88 in the same manner as described in connection with FIGS. 4 and 5. As with FIG. 5, whenever the mobile terminal successfully establishes backup service, the backup service flag is set at 124 before attempting to reestablish primary service.

It will be apparent to those skilled in the art that various modifications and variations can be made in the mobile terminal apparatus and method of the present invention without departing from the spirit or scope of the invention. Thus, it is intended that the present invention cover the modifications and variations of this invention provided they come within the scope of the appended claims and their equivalents.

We claim:

1. A mobile terminal for communicating over a satellite and cellular network comprising:

a transceiver for communicating over the satellite network;

a transceiver for communicating over the cellular network;

a user interface including a handset, having a keypad for selecting one of a plurality of operating modes; and digital processing means coupling the satellite and cellular transceivers and the user interface to one another;

the digital processing means including means for monitoring the availability of both the cellular network and the satellite network concomitantly, means for establishing a communication over one of the satellite and cellular networks in accordance with the selected operating mode and the availability of the satellite and cellular networks, and means for seamlessly handing off an ongoing call over the cellular network to the satellite network in accordance with the monitored signal strength of the cellular network; and wherein the means for handing off an on-going call comprises means for receiving a satellite channel assignment in response to a handoff announcement over the control channel of the cellular network; means for receiving a false frequency of the cellular network; means for acknowledging reception of the false frequency to a cellular network switch for causing the switch to transfer connection of the public switched telephone network to satellite network switch; and means for disabling the cellular transceiver.

2. The mobile terminal apparatus of claim 1 wherein the monitoring means comprises means for periodically determining the service availability of one of the cellular and satellite networks when operating in the other of the cellular and satellite networks, and means for timing repetitive attempts at registration of a mobile apparatus in one of the cellular and satellite networks.

3. A mobile terminal for communicating over a satellite and cellular network comprising:

a transceiver for communicating over the satellite network;

a transceiver for communicating over the cellular network;

a user interface including a handset, having a keypad for selecting one of a plurality of operating modes; and digital processing means coupling the satellite and cellular transceivers and the user interface to one another;

the digital processing means including
- means for monitoring the availability of both the cellular network and the satellite network concomitantly, and
- means for establishing a communication over one of the satellite and cellular networks in accordance with the selected operating mode and the availability of the satellite and cellular networks;

wherein the monitoring means comprises
- means for monitoring a bit error rate on the control channel when the terminal is not in a call over the satellite network;
- means for monitoring the bit error rate on a communication channel of the earth station when the terminal is in a call over the satellite network; and
- means for monitoring call set up and terminate messages of the cellular system.

4. A mobile terminal for communicating over a satellite and cellular network comprising:
- a transceiver for communicating over the satellite network;
- a transceiver for communicating over the cellular network;
- a user interface including a handset, having a keypad for selecting one of a plurality of operating modes; and
- digital processing means coupling the satellite and cellular transceivers and the user interface to one another;
- the digital processing means including
  - means for monitoring the availability of both the cellular network and the satellite network concomitantly, and
  - means for establishing a communication over one of the satellite and cellular networks in accordance with the selected operating mode and the availability of the satellite and cellular networks;
- wherein the selected operating mode comprises an interoperable mode between the satellite and cellular networks with priority given to availability of home location cellular service, including
  - means for determining if cellular service at the home location register is available;
  - means responsive to a no service status at a home location register for initiating a call over the satellite network, and
  - means responsive to a loss of home location during a call for transferring the call to either a visitor's location register in the alternative to a satellite network call.

5. A mobile terminal for communicating over a satellite and cellular network comprising:
- a transceiver for communicating over the satellite network;
- a transceiver for communicating over the cellular network;
- a user interface including a handset, having a keypad for selecting one of a plurality of operating modes; and
- digital processing means coupling the satellite and cellular transceivers and the user interface to one another;
- the digital processing means including
  - means for monitoring the availability of both the cellular network and the satellite network concomitantly, and
  - means for establishing a communication over one of the satellite and cellular networks in accordance with the selected operating mode and the availability of the satellite and cellular networks;

wherein the digital process means includes a central processor, the central processor comprising means governed by the keypad selection for operating the mobile terminal apparatus over the satellite network when both the satellite network and the cellular network are available;
- means for operating the terminal apparatus over the cellular network at times when the satellite network is unavailable; and
- means for performing a handoff to the satellite network at times when the cellular network becomes unavailable.

6. A method effecting interoperability between a cellular network and satellite with a mobile terminal unit having a satellite and cellular transceiver, a user interface with a handset, a digital signal processor connecting the satellite transceiver to the user interface and a central processor connected to the digital signal processor and the cellular transceiver, the method comprising,
- storing codes corresponding to a plurality of selectable operating modes in a non-volatile memory of the terminal;
- establishing a call over one of the satellite and cellular networks in accordance with a selected one of the selectable operating modes and the availability of the satellite and cellular networks; and
- handing-off a call seamlessly to the satellite network in response to a handoff order of the cellular network;
- wherein the step of establishing a call comprises selecting a mode with interoperability between the satellite and cellular mode and priority to the satellite mode, the mode including the substeps of
  - attempting to obtain a control channel in the satellite network;
  - switching to the cellular network, in response to unavailability of the satellite control channel;
  - monitoring the control signals of the satellite network to determine the presence of a control channel; and
  - periodically attempting to re-register in the satellite network in response to the presence of a control channel.

7. A method effecting interoperability between a cellular network and a satellite with a mobile terminal unit having a satellite and cellular transceiver, a user interface with a handset, a digital signal processor connecting the satellite transceiver to the user interface and a central processor connected to the digital signal processor and the cellular transceiver, the method comprising,
- storing codes corresponding to a plurality of selectable operating modes in a non-volatile memory of the terminal;
- establishing a call over one of the satellite and cellular networks in accordance with a selected one of the selectable operating modes and the availability of the satellite and cellular networks; and
- handing-off a call seamlessly to the satellite network in response to a handoff order of the cellular network;
- where the step of selecting a mode, comprises selecting a mode having interoperability with cellular priority, the selected mode including,
  - attempting to register in the cellular mode;
  - handing off a call to the satellite network in response to a handoff order of the cellular network; and
  - checking periodically the availability of the cellular network while the mobile terminal is in satellite operation.

\* \* \* \* \*